(12) United States Patent
Wang et al.

(10) Patent No.: US 11,799,761 B2
(45) Date of Patent: Oct. 24, 2023

(54) SCALING EDGE SERVICES WITH MINIMAL DISRUPTION

(71) Applicant: VMware, Inc., Palo Alto, CA (US)

(72) Inventors: Yong Wang, Sunnyvale, CA (US);
Xinhua Hong, Milpitas, CA (US);
Hongwei Zhu, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/571,409

(22) Filed: Jan. 7, 2022

(65) Prior Publication Data
US 2023/0224240 A1 Jul. 13, 2023

(51) Int. Cl.
| | |
|---|---|
| *H04L 45/24* | (2022.01) |
| *H04L 45/02* | (2022.01) |
| *H04L 12/46* | (2006.01) |
| *H04L 47/2441* | (2022.01) |
| *H04L 45/7453* | (2022.01) |

(52) U.S. Cl.
CPC .......... *H04L 45/24* (2013.01); *H04L 12/4641* (2013.01); *H04L 45/02* (2013.01); *H04L 45/7453* (2013.01); *H04L 47/2441* (2013.01)

(58) Field of Classification Search
None
See application file for complete search history.

(56) References Cited

U.S. PATENT DOCUMENTS

| | | | |
|---|---|---|---|
| 5,204,966 A | 4/1993 | Wittenberg et al. | |
| 5,900,025 A | 5/1999 | Sollars | |
| 6,108,308 A | 8/2000 | Flavin et al. | |
| 6,687,245 B2 | 2/2004 | Fangman et al. | |
| 7,120,693 B2 | 10/2006 | Chang et al. | |

(Continued)

FOREIGN PATENT DOCUMENTS

| | | |
|---|---|---|
| CN | 101641912 A | 2/2010 |
| CN | 103181131 A | 6/2013 |

(Continued)

OTHER PUBLICATIONS

Author Unknown, "Enabling Service Chaining on Cisco Nexus 1000V Series," Month Unknown, 2012, 25 pages, CISCO.

(Continued)

*Primary Examiner* — Christine T Duong
(74) *Attorney, Agent, or Firm* — ADELI LLP

(57) ABSTRACT

Some embodiments provide a method for forwarding data messages between edge nodes that perform stateful processing on flows between a logical network and an external network. At a particular edge node, the method receives a data message belonging to a flow. The edge nodes use a deterministic algorithm to select one of the edge nodes to perform processing for each flow. The method identifies a first edge node to perform processing for the flow in a previous configuration and a second edge node to perform processing for the flow in a new configuration according to the algorithm. When the first and second edge nodes are different, the method uses a probabilistic filter and a stateful connection tracker to determine whether the flow existed prior to a particular time. When the flow did not exist prior to that time, the method selects the second edge node for the received data message.

25 Claims, 9 Drawing Sheets

(56) References Cited

U.S. PATENT DOCUMENTS

| | | |
|---|---|---|
| 7,146,421 B2 | 12/2006 | Syvanne |
| 7,277,401 B2 | 10/2007 | Kyperountas et al. |
| 7,369,557 B1 | 5/2008 | Sinha |
| 7,561,515 B2 | 7/2009 | Ross |
| 7,672,236 B1 | 3/2010 | Karunakaran et al. |
| 7,724,670 B2 | 5/2010 | Nilakantan et al. |
| 7,760,640 B2 | 7/2010 | Brown et al. |
| 7,765,312 B2 | 7/2010 | Monette et al. |
| 7,778,194 B1 | 8/2010 | Yung |
| 7,818,452 B2 | 10/2010 | Matthews et al. |
| 7,826,390 B2 | 11/2010 | Noel et al. |
| 7,865,608 B1 | 1/2011 | Schuba et al. |
| 7,877,515 B2 | 1/2011 | Andersson et al. |
| 7,881,215 B1 | 2/2011 | Daigle et al. |
| 7,948,986 B1 | 5/2011 | Ghosh et al. |
| 8,005,770 B2 | 8/2011 | Minh et al. |
| 8,190,767 B1 | 5/2012 | Maufer et al. |
| 8,261,317 B2 | 9/2012 | Litvin et al. |
| 8,300,532 B1 | 10/2012 | Venkatramani et al. |
| 8,316,113 B2 | 11/2012 | Linden et al. |
| 8,339,994 B2 | 12/2012 | Gnanasekaran et al. |
| 8,369,323 B1 | 2/2013 | Desai |
| 8,370,936 B2 | 2/2013 | Zuk et al. |
| 8,553,552 B2 | 10/2013 | Hu et al. |
| 8,625,426 B2 | 1/2014 | Strulo et al. |
| 8,711,703 B2 | 4/2014 | Allan et al. |
| 8,713,663 B2 | 4/2014 | An |
| 8,737,221 B1 | 5/2014 | Jilani et al. |
| 8,811,401 B2 | 8/2014 | Stroud et al. |
| 8,830,834 B2 | 9/2014 | Sharma et al. |
| 8,897,132 B2 | 11/2014 | Feroz et al. |
| 8,937,865 B1 | 1/2015 | Kumar et al. |
| 8,942,238 B2 | 1/2015 | Kano |
| 9,110,864 B2 | 8/2015 | Jamjoom et al. |
| 9,137,052 B2 | 9/2015 | Koponen et al. |
| 9,166,988 B1 | 10/2015 | Shin et al. |
| 9,231,871 B2 | 1/2016 | Mehta et al. |
| 9,264,313 B1 | 2/2016 | Manuguri et al. |
| 9,270,521 B2 | 2/2016 | Tompkins |
| 9,282,027 B1 | 3/2016 | Brandwine et al. |
| 9,317,469 B2 | 4/2016 | Gross et al. |
| 9,349,135 B2 | 5/2016 | Sarshar |
| 9,374,337 B2 | 6/2016 | Rangaraman et al. |
| 9,391,859 B2 | 7/2016 | Huang et al. |
| 9,401,818 B2 | 7/2016 | Venkatesh |
| 9,450,862 B2 | 9/2016 | Chen et al. |
| 9,497,281 B2 | 11/2016 | Jagadish et al. |
| 9,825,810 B2 | 11/2017 | Jain et al. |
| 9,866,473 B2 | 1/2018 | Parsa et al. |
| 9,876,714 B2 | 1/2018 | Parsa et al. |
| 9,917,727 B2 | 3/2018 | Hong et al. |
| 10,044,617 B2 | 8/2018 | Parsa et al. |
| 10,298,450 B2 | 5/2019 | Hong et al. |
| 10,390,290 B1 | 8/2019 | Zhang et al. |
| 10,715,383 B2 | 7/2020 | Hong et al. |
| 10,951,584 B2 | 3/2021 | Kancherla et al. |
| 11,044,150 B2 | 6/2021 | Hong et al. |
| 11,153,122 B2 | 10/2021 | Dubey et al. |
| 11,296,984 B2 | 4/2022 | Kancherla et al. |
| 11,533,255 B2 | 12/2022 | Parsa et al. |
| 11,570,092 B2 | 1/2023 | Kancherla et al. |
| 2003/0093481 A1 | 5/2003 | Mitchell et al. |
| 2003/0154399 A1 | 8/2003 | Zuk et al. |
| 2004/0018839 A1 | 1/2004 | Andric et al. |
| 2004/0197079 A1 | 10/2004 | Latvala et al. |
| 2005/0055435 A1 | 3/2005 | Gbadegesin et al. |
| 2005/0063324 A1 | 3/2005 | O'Neill et al. |
| 2005/0220098 A1 | 10/2005 | Oguchi et al. |
| 2005/0223102 A1 | 10/2005 | Zhang et al. |
| 2005/0249199 A1 | 11/2005 | Albert et al. |
| 2006/0176882 A1 | 8/2006 | Schein et al. |
| 2006/0193247 A1 | 8/2006 | Naseh et al. |
| 2006/0193252 A1 | 8/2006 | Naseh et al. |
| 2006/0233106 A1 | 10/2006 | Achlioptas et al. |
| 2007/0061492 A1 | 3/2007 | Riel |
| 2007/0180226 A1 | 8/2007 | Schory et al. |
| 2007/0201357 A1 | 8/2007 | Smethurst et al. |
| 2008/0072305 A1 | 3/2008 | Casado et al. |
| 2008/0098113 A1 | 4/2008 | Hansen et al. |
| 2008/0256094 A1 | 10/2008 | Gupta et al. |
| 2008/0259938 A1 | 10/2008 | Keene et al. |
| 2009/0016354 A1 | 1/2009 | Isobe |
| 2009/0097406 A1 | 4/2009 | Nilakantan et al. |
| 2009/0129271 A1 | 5/2009 | Ramankutty et al. |
| 2009/0193122 A1 | 7/2009 | Krishamurthy |
| 2009/0199268 A1 | 8/2009 | Ahmavaara et al. |
| 2009/0235325 A1 | 9/2009 | Dimitrakos et al. |
| 2010/0046530 A1 | 2/2010 | Hautakorpi et al. |
| 2010/0097931 A1 | 4/2010 | Mustafa |
| 2010/0100616 A1 | 4/2010 | Bryson et al. |
| 2010/0149966 A1 | 6/2010 | Achlioptas et al. |
| 2010/0235495 A1 | 9/2010 | Petersen et al. |
| 2010/0268935 A1 | 10/2010 | Rodgers et al. |
| 2010/0271964 A1 | 10/2010 | Akhter et al. |
| 2010/0302940 A1 | 12/2010 | Patel et al. |
| 2011/0013639 A1 | 1/2011 | Matthews et al. |
| 2011/0026537 A1 | 2/2011 | Kolhi et al. |
| 2011/0069632 A1 | 3/2011 | Chen et al. |
| 2011/0213888 A1 | 9/2011 | Goldman et al. |
| 2011/0258199 A1 | 10/2011 | Oliver et al. |
| 2012/0106560 A1 | 5/2012 | Gumaste |
| 2012/0131216 A1 | 5/2012 | Jain et al. |
| 2012/0155266 A1 | 6/2012 | Patel et al. |
| 2012/0216282 A1 | 8/2012 | Pappu et al. |
| 2012/0250682 A1 | 10/2012 | Vincent et al. |
| 2012/0258712 A1 | 10/2012 | Rozinov |
| 2012/0314709 A1 | 12/2012 | Post et al. |
| 2013/0007740 A1 | 1/2013 | Kikuchi et al. |
| 2013/0073743 A1 | 3/2013 | Ramasamy et al. |
| 2013/0121209 A1 | 5/2013 | Padmanabhan et al. |
| 2013/0155902 A1 | 6/2013 | Feng et al. |
| 2013/0163594 A1 | 6/2013 | Sharma et al. |
| 2013/0174177 A1 | 7/2013 | Newton et al. |
| 2013/0201989 A1 | 8/2013 | Hu et al. |
| 2013/0227550 A1 | 8/2013 | Weinstein et al. |
| 2013/0239198 A1 | 9/2013 | Niemi et al. |
| 2013/0254085 A1 | 9/2013 | Tanimoto et al. |
| 2013/0265875 A1 | 10/2013 | Dyke et al. |
| 2013/0329584 A1 | 12/2013 | Ghose et al. |
| 2013/0332983 A1 | 12/2013 | Koorevaar et al. |
| 2013/0336337 A1 | 12/2013 | Gopinath et al. |
| 2014/0050091 A1 | 2/2014 | Biswas et al. |
| 2014/0059544 A1 | 2/2014 | Koganty et al. |
| 2014/0068602 A1 | 3/2014 | Gember et al. |
| 2014/0092906 A1 | 4/2014 | Kandaswamy et al. |
| 2014/0115578 A1 | 4/2014 | Cooper et al. |
| 2014/0195666 A1 | 7/2014 | Dumitriu et al. |
| 2014/0198649 A1 | 7/2014 | Jain et al. |
| 2014/0269733 A1 | 9/2014 | Venkatesh |
| 2014/0297964 A1 | 10/2014 | Nakase |
| 2014/0301388 A1 | 10/2014 | Jagadish et al. |
| 2014/0304399 A1 | 10/2014 | Chaudhary et al. |
| 2014/0310418 A1 | 10/2014 | Sorenson, III et al. |
| 2014/0323127 A1 | 10/2014 | Evans et al. |
| 2014/0380087 A1 | 12/2014 | Jamjoom et al. |
| 2015/0003453 A1 | 1/2015 | Sengupta et al. |
| 2015/0095404 A1 | 4/2015 | Perlman |
| 2015/0106420 A1 | 4/2015 | Warfield et al. |
| 2015/0146539 A1 | 5/2015 | Mehta et al. |
| 2015/0263899 A1 | 9/2015 | Tubaltsev et al. |
| 2015/0281042 A1* | 10/2015 | Agarwal ............... H04L 45/64 709/238 |
| 2015/0312155 A1 | 10/2015 | Anand et al. |
| 2015/0350087 A1 | 12/2015 | Hong et al. |
| 2015/0379430 A1 | 12/2015 | Dirac et al. |
| 2016/0006654 A1 | 1/2016 | Fernando et al. |
| 2016/0028630 A1 | 1/2016 | Wells |
| 2016/0028855 A1 | 1/2016 | Goyal et al. |
| 2016/0043901 A1 | 2/2016 | Sankar et al. |
| 2016/0065479 A1 | 3/2016 | Harper et al. |
| 2016/0080261 A1 | 3/2016 | Koponen et al. |
| 2016/0119229 A1 | 4/2016 | Zhou |
| 2016/0119236 A1 | 4/2016 | DeCusatis et al. |
| 2016/0142295 A1 | 5/2016 | Parsa et al. |

(56) References Cited

U.S. PATENT DOCUMENTS

| | | | |
|---|---|---|---|
| 2016/0142296 A1 | 5/2016 | Parsa et al. |
| 2016/0142297 A1 | 5/2016 | Parsa et al. |
| 2016/0142314 A1 | 5/2016 | Parsa et al. |
| 2016/0226700 A1 | 8/2016 | Zhang et al. |
| 2016/0241669 A1 | 8/2016 | Royon et al. |
| 2016/0308770 A1 | 10/2016 | Zhang et al. |
| 2016/0315814 A1 | 10/2016 | Thirumurthi et al. |
| 2017/0048136 A1 | 2/2017 | Williams |
| 2017/0085486 A1 | 3/2017 | Chung et al. |
| 2017/0142226 A1 | 5/2017 | Foy et al. |
| 2017/0150418 A1 | 5/2017 | Kim et al. |
| 2017/0195169 A1 | 7/2017 | Mills et al. |
| 2017/0257801 A1 | 9/2017 | Toth et al. |
| 2018/0198679 A1 | 7/2018 | Hong et al. |
| 2018/0248805 A1 | 8/2018 | Kamat et al. |
| 2018/0278541 A1 | 9/2018 | Wu et al. |
| 2019/0021029 A1 | 1/2019 | Rydnell et al. |
| 2019/0036815 A1 | 1/2019 | Kancherla et al. |
| 2019/0036819 A1 | 1/2019 | Kancherla et al. |
| 2019/0036881 A1 | 1/2019 | Kancherla et al. |
| 2019/0260610 A1 | 8/2019 | Dubey et al. |
| 2019/0273656 A1 | 9/2019 | Hong et al. |
| 2020/0336370 A1 | 10/2020 | Hong et al. |
| 2021/0314221 A1 | 10/2021 | Hong et al. |
| 2022/0103476 A1 | 3/2022 | Sun et al. |
| 2023/0124797 A1 | 4/2023 | Parsa et al. |

FOREIGN PATENT DOCUMENTS

| | | |
|---|---|---|
| CN | 103647656 A | 3/2014 |
| CN | 103701900 A | 4/2014 |
| CN | 103930882 A | 7/2014 |
| CN | 104022891 A | 9/2014 |
| CN | 104011687 B | 9/2017 |
| EP | 1890438 A1 | 2/2008 |
| WO | 2008095010 A1 | 8/2008 |
| WO | 2016076900 A1 | 5/2016 |

OTHER PUBLICATIONS

Wersa, Luis, et al., "Load Balancing a Cluster of Web Servers Using Distributed Packet Rewriting," Computer Science Department Technical Report, Jan. 6, 1999, 13 pages, Boston University, Boston, MA, USA.

Dixon, Colin, et al., "An End to the Middle," Proceedings of the 12th Conference on Hot Topics in Operating Systems, May 2009, 5 pages, USENIX Association, Berkeley, CA, USA.

Guichard, J., et al., "Network Service Chaining Problem Statement," Network Working Group, Jun. 13, 2013, 14 pages, Cisco Systems, Inc.

Harper, Matthew H., et al., (U.S. Appl. No. 62/042,049), filed Aug. 26, 2014, 27 pages.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Koponen, Teemu, et al., "Network Virtualization in Multi-tenant Datacenters," Technical Report TR-2013-001E, Aug. 2013, 22 pages, VMware, Inc., Palo Alto, CA, USA.

Schroeder, Trevor, et al., "Scalable Web Server Clustering Technologies," IEEE Network, vol. 14, No. 3, May 1, 2000, 8 pages, IEEE Service Center, New York, NY, USA.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Liu, Bing, et al., "CFN-dyncast: Load Balancing the Edges via the Network," 2021 IEEE Wireless Communications and Networking Conference Workshops, Mar. 20, 2021, 6 pages, IEEE, Nanjing, China.

* cited by examiner

| CH Bucket | Prev. Config. | New Config. |
|---|---|---|
| 0 | Node 1 | Node 1 |
| 1 | Node 2 | Node 5 |
| 2 | Node 2 | Node 2 |
| 3 | Node 1 | Node 1 |
| 4 | Node 4 | Node 4 |
| 5 | Node 2 | Node 2 |
| 6 | Node 3 | Node 3 |
| 7 | Node 1 | Node 1 |
| 8 | Node 4 | Node 4 |
| 9 | Node 3 | Node 5 |
| 10 | Node 3 | Node 3 |
| 11 | Node 1 | Node 5 |
| 12 | Node 2 | Node 2 |
| 13 | Node 4 | Node 4 |
| 14 | Node 3 | Node 3 |
| 15 | Node 4 | Node 4 |

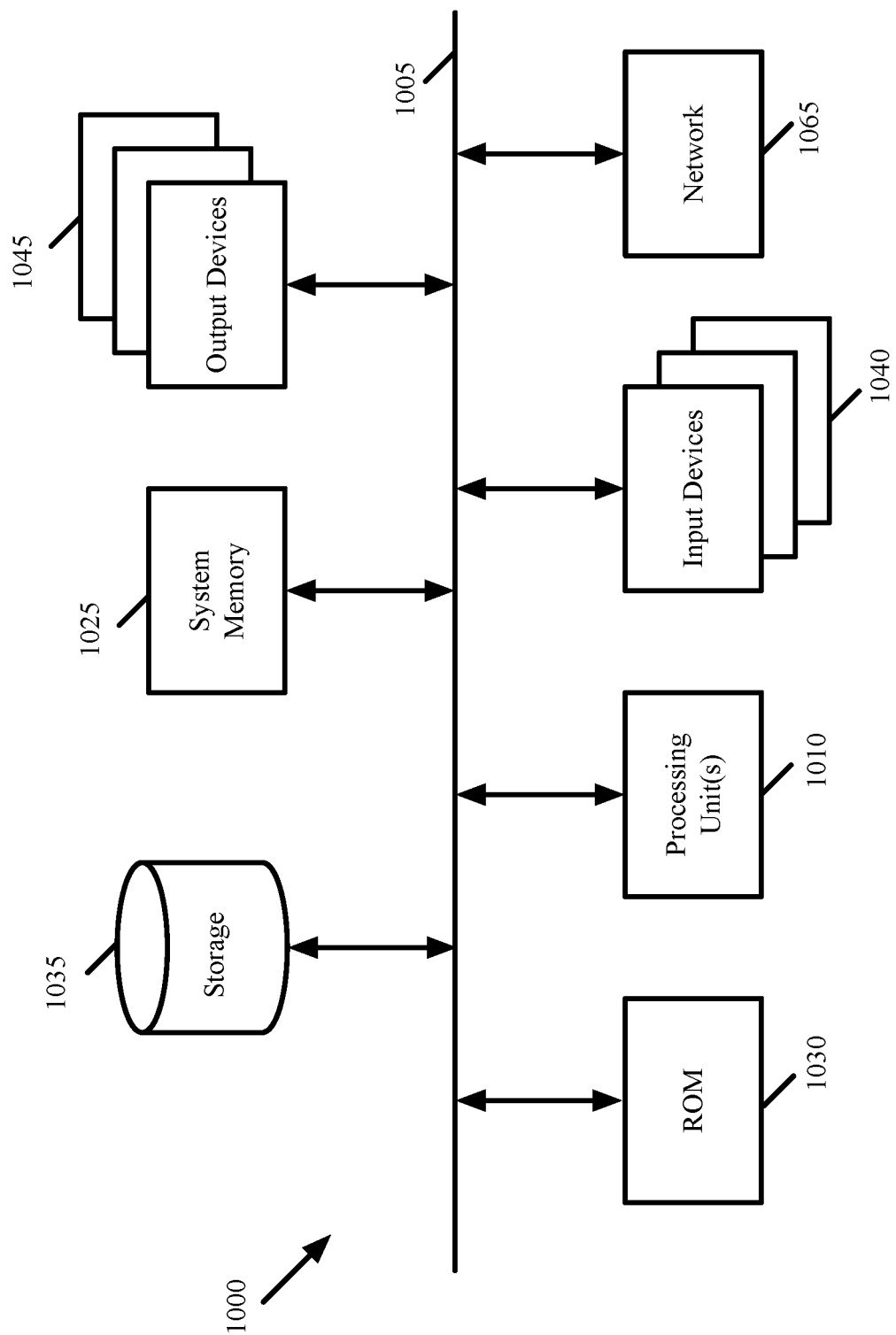

SCALING EDGE SERVICES WITH MINIMAL DISRUPTION

BACKGROUND

Logical networks implemented in datacenters often include gateways implemented on edge nodes that provide services to data traffic sent between the logical network and external networks. If these services are stateful, the gateways have typically been implemented in an active-standby configuration such that only one of the edge nodes is active at a time. In this configuration, traffic originating from the logical network and traffic originating from the external network is all sent to the same active edge node. The state can be synchronized to a backup node in case of failover. However, the single active edge node can be a bottleneck, so an active-active configuration in which traffic is split among the multiple active edge nodes is especially preferable for networks with a large amount of such "north-south" traffic.

BRIEF SUMMARY

Some embodiments provide a method for scaling the number of edge nodes that implement a logical router gateway to perform stateful processing on data message flows between a logical network and an external network in an active-active configuration. In the active-active configuration, data messages are sent from the external network to the edge nodes using a first equal-cost multi-path (ECMP) algorithm and sent from the logical network to the edge nodes using a second ECMP algorithm such that the data messages of a data message flow in one direction may not be sent to the same edge node as the data messages of the data message flow in the other direction. In such a scenario, the edge nodes use a deterministic algorithm (e.g., a consistent hashing algorithm) to select a respective one of the edge nodes to perform stateful processing for each respective data message flow (and forward the data message to the selected edge node for stateful processing). The deterministic algorithm is such that the same edge node is selected for data messages in both directions for a data message flow even if those data messages are initially sent to two different edge nodes (e.g., by hashing or otherwise using the destination network address for northbound data messages sent from the logical network and hashing or otherwise using the source network address for southbound data messages sent from the external network).

In this context, some embodiments use a staged transition in order to scale out the active-active edge cluster (increase the number of edge nodes) or scale in the active-active edge cluster (decrease the number of edge nodes). During a first stage, each edge node in the cluster (including the newly added edge node or the to be removed edge node) is configured to compute a consistent hashing table that identifies which data message flows will be moved in the future (new) configuration (with the new node added or specified node removed) as compared to the previous (existing) configuration as well as build up a probabilistic filter (e.g., a bloom filter) that identifies existing flows (including flows that start during the new stage). The consistent hashing table, in some embodiments, can be used to identify for each data message flow (e.g., by hashing the identifying network address and placing this into a hash bucket) (i) a first edge node to perform stateful processing for the data message flow in the previous configuration of the edge nodes and (ii) a second edge node to perform stateful processing for the data message flow in the new configuration of the edge nodes, according to the consistent hashing algorithm of some embodiments. The probabilistic filter, in some embodiments, is a bloom filter that includes an entry for at least each data message flow for which the identified first and second edge nodes are different (if the first and second edge nodes are the same for a given data message flow, then the transition does not affect the data message flow). In other embodiments, the bloom filter also includes entries for data message flows for which the identified first and second edge nodes are the same. In some embodiments, each of the edge nodes builds up these data structures separately for the data message flows that they receive in each direction.

During the first stage of some embodiments, the edge nodes always select the first edge node as the node to perform stateful processing for each received data message and send the data message to the selected edge node. That is, during this first stage, a newly added edge node may receive data messages from the logical network or the external network (if their respective ECMP algorithms have been updated to account for the new node) but always redirects ("punts") these data messages to one of the previously-existing edge nodes.

After a pre-specified time duration, the first stage ends and a second stage of the transition begins. During this second stage, data message flows that existed prior to the second stage are sent to their respective first edge node (i.e., the node for performing stateful processing on the data message flows is selected using the previous configuration) while new data message flows are sent to their respective second edge node (i.e., the node for performing stateful processing on the data message flows is selected using the new configuration).

To affect these conditions, the edge nodes use their respective consistent hashing tables and probabilistic filters that were built up during the first stage. During the second stage, as with the first, any data message flows for which the first and second edge nodes align can be sent to this edge node without consulting the probabilistic filter, and an ideal consistent hashing algorithm places the majority of data message flows into this category. For new flows, the same principle applies, and if the two prospective edge nodes align no additional data structures need to be consulted. A nature of using a consistent hashing algorithm is that many of the data message flows will not move when the edge node configuration changes (as opposed to a simple modulo N hashing algorithm).

However, when the edge node that receives a data message identifies two different prospective edge nodes for the data message flow to which that data message belongs, the edge node consults its probabilistic filter to identify whether the data message flow existed prior to the second stage. If the data message flow does not have a matching entry in the probabilistic filter, then the data message flow did not exist prior to the second stage. In this case, the data message can be treated as a new data message flow and redirected to the edge node identified using the new configuration.

If a matching entry is found in the probabilistic filter for a data message flow, then this is indicative of the possibility that the data message flow is an older flow that existed prior to the second stage of transition. However, the nature of probabilistic filters such as bloom filters is such that false positives are possible. As such, some embodiments also use a stateful connection tracker to determine which edge node to select for data message flows that match an entry in the probabilistic filter. In the case of a match in the probabilistic filter, the recipient edge node first checks the data message to determine whether it is a connection setup message (e.g., a TCP SYN or SYN-ACK message) such that the edge node would not have yet received any data messages belonging to the flow. If the data message is a connection setup message, then the data message flow did not exist prior to the beginning of the second stage. As such, the edge node adds an entry to the stateful connection tracker for the data message flow and redirects the data message to the second identified edge node for the data message flow (i.e., uses the new edge node configuration to redirect the data message).

The stateful connection tracker can then be used to identify future data messages (i.e., that are not connection setup messages) for those connections that would otherwise have a false positive match in the probabilistic filter. In some embodiments, the recipient edge node determines whether an entry for the data message flow exists in the stateful connection tracker, either before consulting the probabilistic filter for the data message or after determining that the data message has matched an entry in the probabilistic filter.

As noted, the stateful connection tracker of some embodiments is used to track connections that started in the second stage in order to identify when a false positive is returned by the probabilistic filter. However, use of the stateful connection tracker can require more resources (e.g., significantly more storage space per flow) than a probabilistic filter, and thus the probabilistic filter is used as a first measure to identify new data message flows. If an entry is found in the stateful connection tracker, then the data message flow did not exist prior to the second stage, so the edge node redirects the data message to the second identified edge node for the data message flow (i.e., uses the new edge node configuration to redirect the data message). If there is no entry in the stateful connection tracker, a positive match in the probabilistic filter, and the data message is not a connection setup message indicative of the first data message that the edge node would receive for a flow, then the edge node identifies the data message flow as existing prior to the second stage and redirects the data message to the first identified edge node for the data message flow (i.e., uses the previous edge node configuration to redirect the data message).

Thus, in the case of a new edge node being added, the new edge node is only selected to perform stateful processing for data message flows that did not exist prior to the start of the second transition stage. Conversely, in the case of an edge node being removed, the edge node specified for removal is only selected to perform stateful processing for data message flows that existed prior to the start of the second transition stage.

After another pre-specified time duration, the second stage ends and a third stage begins. In the third stage, all data message flows are redirected according to the new edge node configuration. As such, the edge nodes can remove their probabilistic filters and consistent hashing tables and simply use the consistent hashing algorithm according to the new edge node configuration.

In some embodiments, the edge nodes are directed by a network management and control system to begin the transition process. For instance, the network management and control system of some embodiments sends synchronized control messages to each of the edge nodes specifying the new edge node configuration (e.g., specifying information for the newly added edge node or indicating which edge node is to be removed) and when to begin the first transition stage. In some such embodiments, each of the transition stages has a prespecified time duration, making additional control messages unnecessary. Each of the edge nodes transitions from the first to second and second to third stages at the same time so long as the first stage begins at the same time for all of the edge nodes.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 10 conceptually illustrates an electronic system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for scaling the number of edge nodes that implement a logical router gateway to perform stateful processing on data message flows between a logical network and an external network in an active-active configuration. Some embodiments use a staged transition in order to scale out the active-active edge cluster (increase the number of edge nodes) or scale in the active-active edge cluster (decrease the number of edge nodes).

Figure 1:
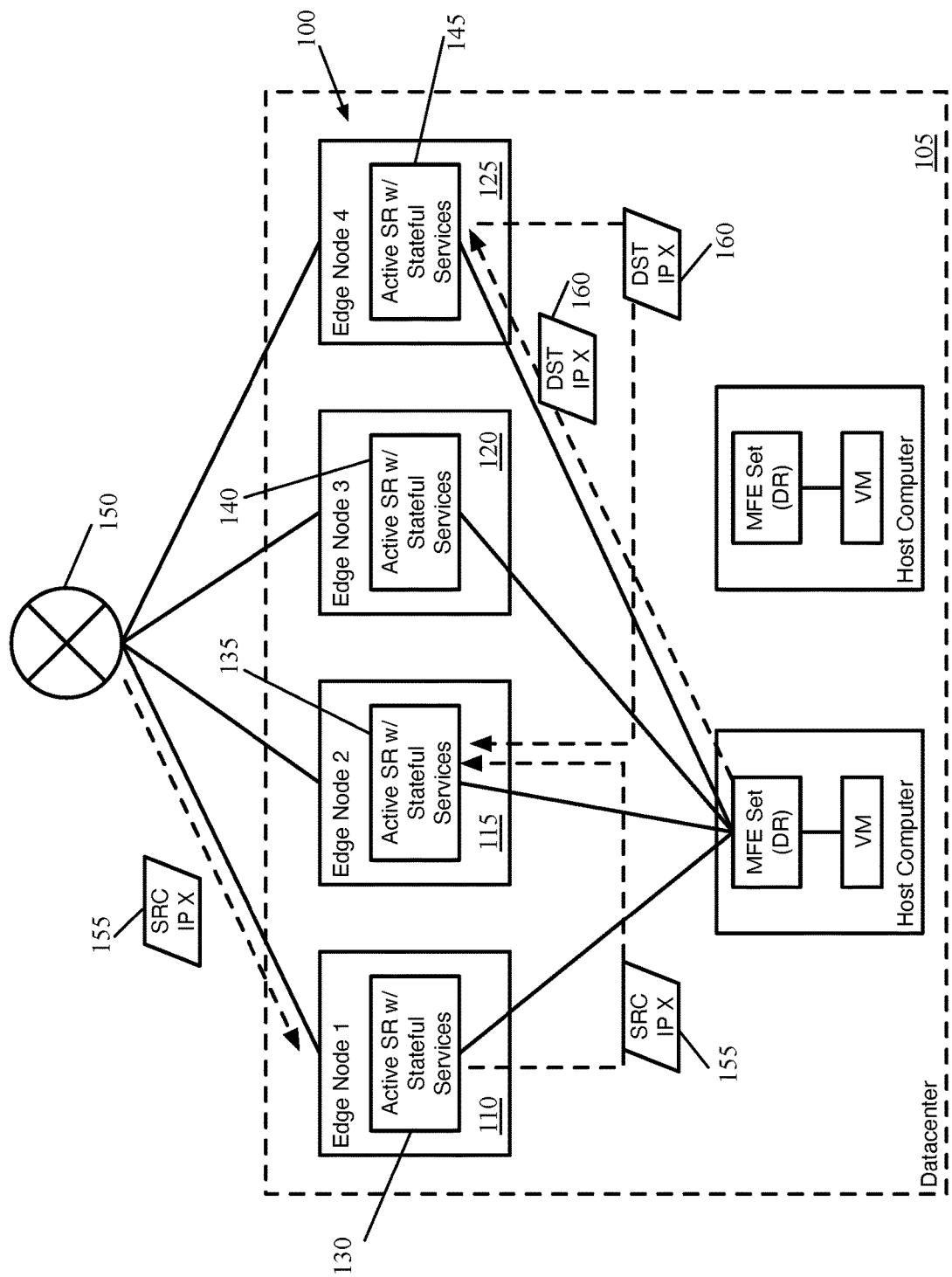
FIG. 1 conceptually illustrates an edge cluster operating in active-active configuration in a datacenter.

FIG. 1 conceptually illustrates an edge cluster 100 operating in active-active configuration in a datacenter 105. It should be noted that while this example shows an active-active edge cluster for a logical network implemented in a single datacenter, in other embodiments the logical network and/or edge cluster is stretched across multiple datacenters (e.g., at different geographic locations). In some embodiments, the logical network is stretched across multiple datacenters with an active-active edge cluster operating in each of these datacenters (or at least a subset of the datacenters). In some such embodiments, each active-active edge cluster operates in the manner described herein.

As shown, the edge cluster 100 includes four edge nodes 110-125, each of which implements a centralized logical router gateway that provides stateful services (also referred to here as a service router). In some embodiments, logical networks implemented within a datacenter or set of datacenters include multiple logical forwarding elements, such as logical switches (to which logical network endpoints, such as virtual machines and/or containers, attach) and logical routers. The logical routers, in some embodiments, can include multiple components, such as a distributed router (DR) and multiple service routers (SRs). Each SR is implemented on a single edge node (or, in some cases, on a pair of edge nodes in active-standby configuration). In some embodiments, the logical router is configured with multiple uplinks connecting the logical network to external networks and a separate SR is implemented (on a separate edge node) for each uplink. The DR is implemented across numerous host computers that also implement logical switches (and/or other logical routers) as well as the centralized edge nodes that implement the SRs. The configuration and implementation of these logical routers is described in greater detail in U.S. Pat. No. 9,787,605 and U.S. Patent Publication 2021/0314192, both of which are incorporated herein by reference.

As mentioned, each of the edge nodes 110-125 in the edge cluster 100 implements a separate SR 130-145 that performs stateful services for data messages sent to and from the logical network. These stateful services may include network address translation (NAT), stateful firewall operations (e.g., that use connection tracking), as well as other services. Each data message (or at least many of the data messages) sent from the logical network in the datacenter 105 to an external network, or vice versa, has these stateful services applied by one of the edge nodes 110-125.

In this example, a physical network router 150 (e.g., a top of rack (TOR) switch or router) sends data messages from external networks (e.g., data messages originating from completely separate logical networks in other datacenters, personal devices contacting an application or web server located in the datacenter 105, etc.) to the edge cluster 100 using a first equal-cost multi-path (ECMP) algorithm. In the other direction, managed forwarding element (MFE) sets executing on host computers (e.g., virtual routers and/or virtual switches executing in the virtualization software of the host computers) implement the DR as well as other logical forwarding elements. The implementation of the DR specifies a second ECMP algorithm for sending data messages directed to external addresses to the edge cluster 100. These two different ECMP algorithms (the first of which the datacenter and/or logical network administrator may not have any control over) may be different such that the data messages of a data message flow in one direction are not always sent to the same edge node as the data messages of the data message flow in the other direction.

For instance, a first data message 155 is sent from the external physical network router 150 to the first edge node 110. However, a second data message 160 (belonging to the same data message flow as the first data message 155) is sent from a host computer 160 to the fourth edge node 125. In this scenario, each of the edge nodes 110-125 uses the same deterministic algorithm (e.g., a hash function) to select one of the edge nodes to perform stateful processing for each data message flow and forward the data messages to the selected edge nodes for stateful processing and forwarding. The deterministic algorithm is such that the same edge node is selected for data messages in both directions for a data message flow even if those data messages are initially sent to two different edge nodes. For instance, some embodiments hash or otherwise use the destination network address for northbound data messages sent from the logical network and hash or otherwise use the source network address for southbound data messages sent from the external network.

Thus, in the example, the first edge node 110 computes a hash based on the source IP X of the first data message 155. Based on this hash and an algorithm for mapping the hash to an edge node, the first edge node 110 forwards the first data message 155 to the second edge node 115. Upon receiving the second data message 160, the fourth edge node 125 computes a hash based on the destination IP X of the data message (using the same hash function as used by the first edge node 110). Based on this hash and the algorithm for mapping the hash to an edge node (also the same across all of the edge nodes), the fourth edge node 125 forwards the second data message 160 to the second edge node 115. This allows the second edge node 115 to keep connection state for the data message flow and perform stateful services on data messages sent in both directions for the data message flow. In some embodiments, the external network address (e.g., the source address for incoming data messages and the destination address for outgoing data messages) is used for the hash because this address is not subject to network translation and thus will be a constant for both directions of the data message flow. In addition, whereas a logical network address may be the same across many data message flows (and thus the use of such a logical network address could result in overloading a single edge node of the cluster, this is less likely to be the case for an external network address.

For various reasons, the number of edge nodes in a cluster could require updating. In some embodiments, a logical router may be configured for auto-scaling, such that if the amount of traffic exceeds a threshold, then an edge node is added, whereas if the amount of traffic falls below a threshold then an edge node is removed. In other embodiments, an administrator might choose to automatically add an edge node to or remove an edge node from a cluster.

Figure 2:
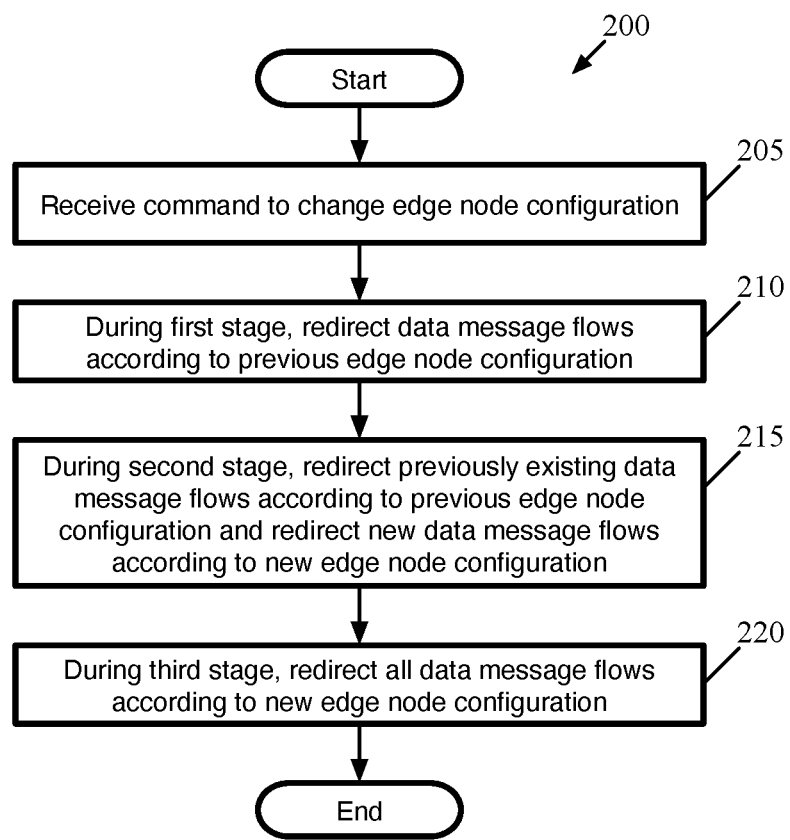
FIG. 2 conceptually illustrates a process of some embodiments for implementing such a staged transition to change the number of nodes in an edge cluster.

In this context, some embodiments use a staged transition in order to scale out the active-active edge cluster (increase the number of edge nodes) or scale in the active-active edge cluster (decrease the number of edge nodes). FIG. 2 conceptually illustrates a process 200 of some embodiments for implementing such a staged transition to change the number of nodes in an edge cluster. In some embodiments, the process 200 is performed by each of the edge nodes in a cluster, including any new edge nodes, except that at the third stage any nodes being removed are no longer participating in the cluster and thus cannot perform that operation.

As shown, the process 200 begins by receiving (at 205) a command to change the edge node configuration for a cluster. In some embodiments, each of the edge nodes receives a control message (or set of control messages) from a network management and control system specifying that the edge cluster configuration is changing (and indicating the new edge cluster configuration). In addition, if a new edge node is being added, some embodiments provide information regarding the new edge node (e.g., network and/or data link layer addresses for the edge node and the SR implemented by the edge node, how to incorporate the new edge node into a consistent hashing algorithm used to distribute traffic, etc.). In some embodiments, to simplify the transitions, only one edge node can be added or removed per configuration change. If multiple changes are to be made, these changes are made serially. In addition, it should be noted that the removal of an edge node from a cluster described herein is a graceful removal. If an edge node fails and is removed without transition, some embodiments use high availability state sharing techniques (e.g., with state sharing between pairs) to avoid connection loss.

In some embodiments, the control messages sent to each of the edge nodes are synchronized. The synchronization in these control messages specifies when to begin the first transition stage to add or remove an edge node. In some such embodiments, each of the transition stages has a prespecified time duration, making additional control messages unnecessary. Each of the edge nodes transitions from first to second and second to third stages at the same time so long as the first stage begins at the same time for all of the edge nodes.

Figure 3:
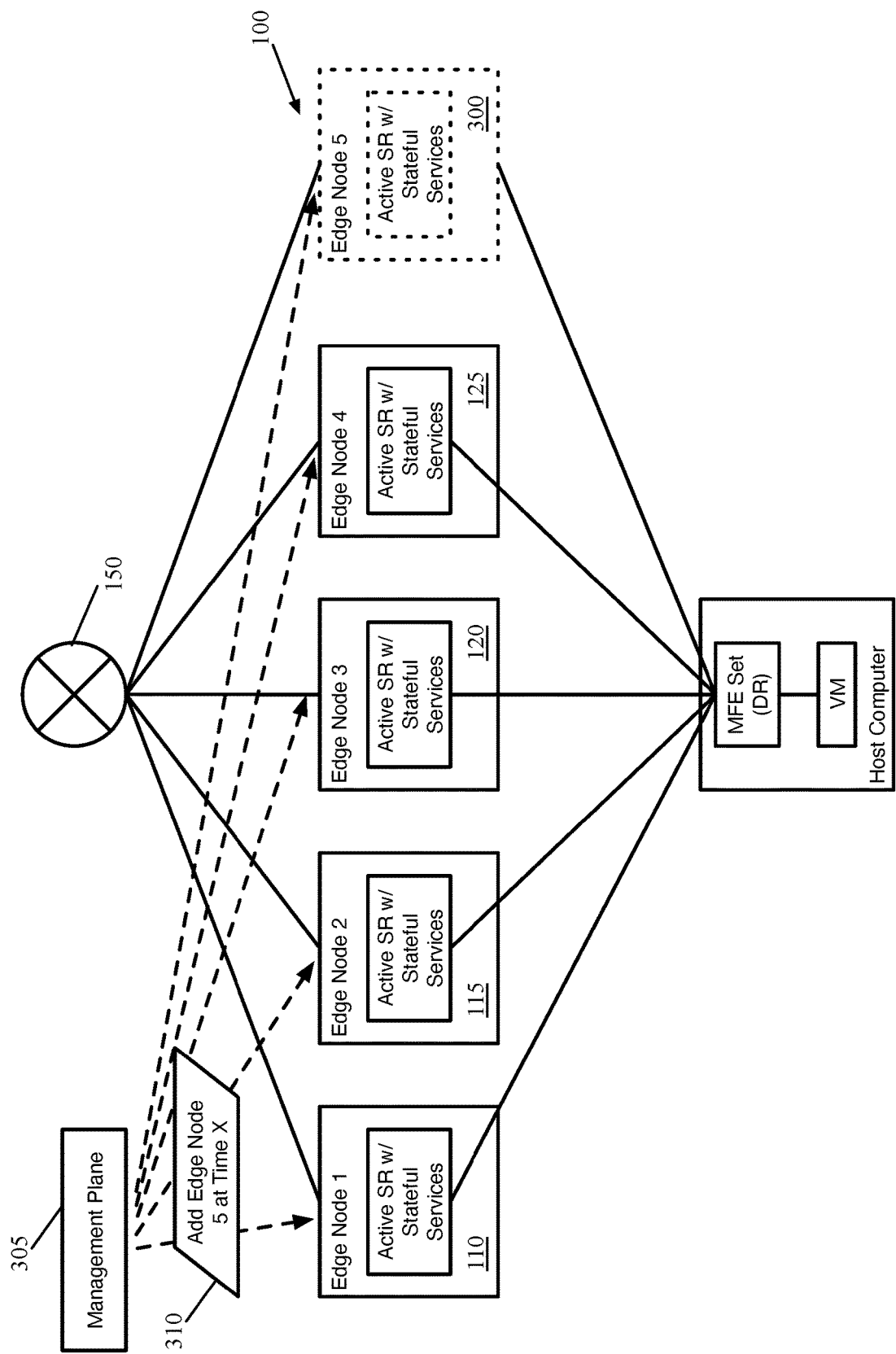
FIG. 3 conceptually illustrates the addition of a new edge node to the edge cluster shown in FIG. 1.

FIG. 3 conceptually illustrates the addition of a new edge node 300 to the edge cluster 100 shown in FIG. 1. As shown in this figure, a fifth edge node 300 that also implements an SR (i.e., for the same logical router) is being added to the cluster 100. To inform the other edge nodes of this addition, management plane 305 sends control messages 310 to the existing edge nodes 110-125 specifying to add the new edge node 300, starting at a particular time. The control messages, as noted, also include additional information about the edge node (e.g., network and/or data link addresses). The new edge node 300 also learns of the start time for the transition and is provided with data about the previously existing edge nodes 110-125. In some embodiments, the network control system includes both a management plane (e.g., a set of network managers) and a control plane (e.g., a set of network controllers), with the management plane being responsible for managing the transition of the edge node cluster. Such a network control system of some embodiments is described in U.S. Patent Publication 2021/0314212, which is incorporated herein by reference. As shown in the figure, when the new edge node 300 is added, some embodiments provide information to the MFEs that implement the DR (e.g., via the management plane 305 and/or control plane) as well as to the external router 150 (e.g., via routing protocol and/or gratuitous ARP messages from the new edge node 300), so that the new edge node can be factored into their respective ECMP algorithms.

Figure 4:
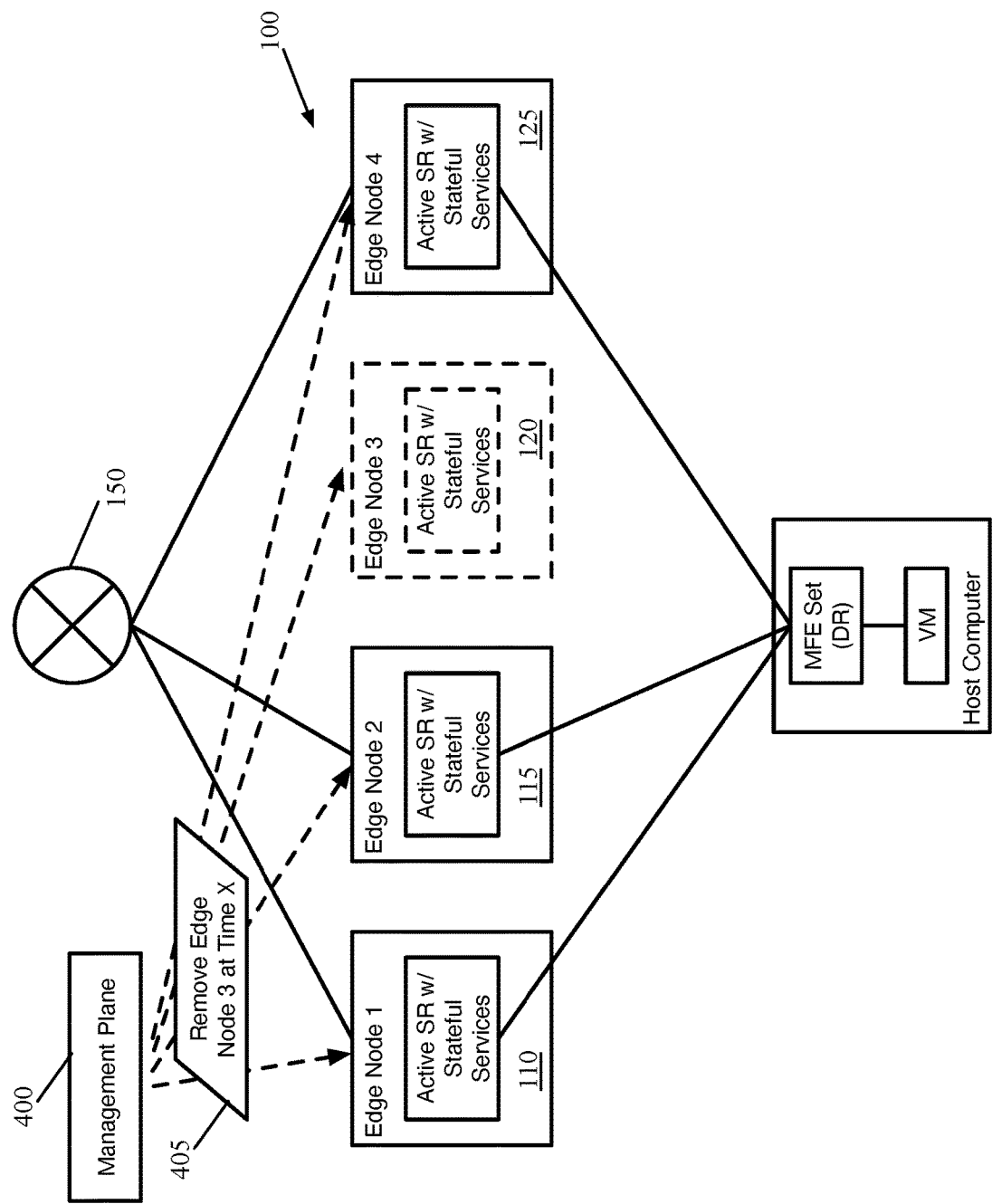
FIG. 4 conceptually illustrates the removal of one of the edge nodes from the edge cluster shown in FIG. 1.

FIG. 4 conceptually illustrates the removal of one of the edge nodes 120 from the edge cluster 100 shown in FIG. 1. As shown in the figure, the third edge node 120 (and thus the SR 140) is being removed from the cluster 100. To inform all of the edge nodes of this intended removal, the management plane 400 sends control messages 405 to all of the edge nodes 110-125 (i.e., including the edge node to be removed) specifying that the edge node 120 is to be removed, with the removal process starting at a particular time. Unlike the addition of a new edge node, there is no requirement to inform the edge nodes of any details about the edge node 120. As shown in the figure, when the edge node 120 is removed, some embodiments provide information to the MFEs that implement the DR (e.g., via the management plane 400 and/or control plane) as well as to the external router 150 (e.g., via routing protocol messages or the cessation thereof), so that their respective ECMP algorithms can factor in the removal of the edge node. In some embodiments, the management plane 400 is required to remove a particular one of the edge nodes 120 (e.g., based on node identifiers for the edge nodes). Other embodiments do not have such a requirement.

Returning to FIG. 2, during a first stage of transition, the process 200 redirects (at 210) data message flows according to the previous edge node configuration. As described further below, upon receiving the command to change the edge node configuration, each of the edge nodes (including a newly added new edge node and, in some such embodiments, an edge node specified for removal) computes a consistent hashing table that can be used to identify which data message flows will be moved in the new configuration as compared to the previous configuration. Each of the edge nodes also builds up a probabilistic filter (e.g., a bloom filter) in some embodiments, as will be described below.

During the first stage of some embodiments, the edge nodes always redirect data messages based on the previous edge node configuration according to the consistent hashing table, while building up the bloom filter. Thus, during this first stage, a newly added edge node may receive data messages from the logical network or the external network (if their respective ECMP algorithms have been updated to account for the new node) but always redirects these data messages to one of the previously-existing edge nodes. That is, referring to FIG. 3, the newly added edge node 300 will receive data messages at this stage from the MFEs and from the external router 150, but will not perform stateful processing on these data messages. Instead, the edge node 300 redirects these data messages to the other four edge nodes 110-125. Similarly, even if the ECMP algorithms have been updated to indicated that an edge node specified for removal is no longer an option so that the edge node will not directly receive data messages, the other edge nodes will still redirect a portion of the data messages to that edge node, which performs stateful processing on the redirected data messages. Referring to FIG. 4, the edge node 120 no longer receives data messages directly from the MFEs or from the external router 150. However, the other three edge nodes 110, 115, and 125 will still redirect some portion of data messages to the third edge node 120.

Next, during a second stage of the transition, the process 200 redirects (at 215) previously existing data message flows according to the previous edge node configuration and redirects new data message flows according to the new edge node configuration. That is, the particular point in time at which the edge nodes transition from the first stage to the second stage marks the point in time after which new data message flows are redirected for stateful processing according to the new configuration. Thus, newly added edge nodes are, at this point, both directly receiving data messages and performing stateful processing on data messages that belong to new connections. Edge nodes specified for removal are still performing stateful processing on data messages that belong to previously-existing connections.

In order to ensure this redirection, the recipient edge node for a data message (i.e., the edge node that receives the data message from the external router or datacenter managed forwarding element) uses the consistent hashing table to determine if the processing edge node (i.e., the edge node selected to perform stateful processing on the data message flow to which the data message belongs) changed between the previous and new edge node configurations. If the processing edge node has not changed, then the data message can be redirected to that edge node without any further consideration. If the processing edge node is different between the two configurations, then the recipient edge node uses the probabilistic filter built up during the first stage to identify whether the data message belongs to a new or previously-existing data message flow. Because the probabilistic filter has a possibility of false positives (a consequence of the space-saving enabled by the probabilistic filter), the recipient edge node also verifies that any data messages identified as previously-existing by the probabilistic filter are not either connection initiation messages (which would indicate a new connection) or messages belonging to data message flows that have previously been identified as new connections.

Finally, during a third stage, the process 200 redirects (at 220) all data message flows according to the new configuration. The process 200 then ends. At this stage, the consistent hashing tables for the previous configuration and the probabilistic filters are no longer needed. In addition, any edge node specified for removal is actually removed at this point. The duration of the second stage is typically set so that there are very few, if any, remaining flows that existed during the first stage of the transition once this third stage is reached. These few remaining flows, if they move from one processing edge node to another, will be interrupted as a result of the transition.

As indicated, during the first stage, each edge node in the cluster (including a newly added edge node and, in some embodiments, an edge node to be removed) is configured to compute a consistent hashing table that identifies which data message flows will be moved in the new configuration (with the new node added or specified node removed) as compared to the previous configuration. Each edge node (again including a newly added edge node and, in some embodiments, an edge node to be removed) also builds up a probabilistic filter (e.g., a bloom filter) that identifies existing flows (including flows that start during the new stage).

Figure 5:
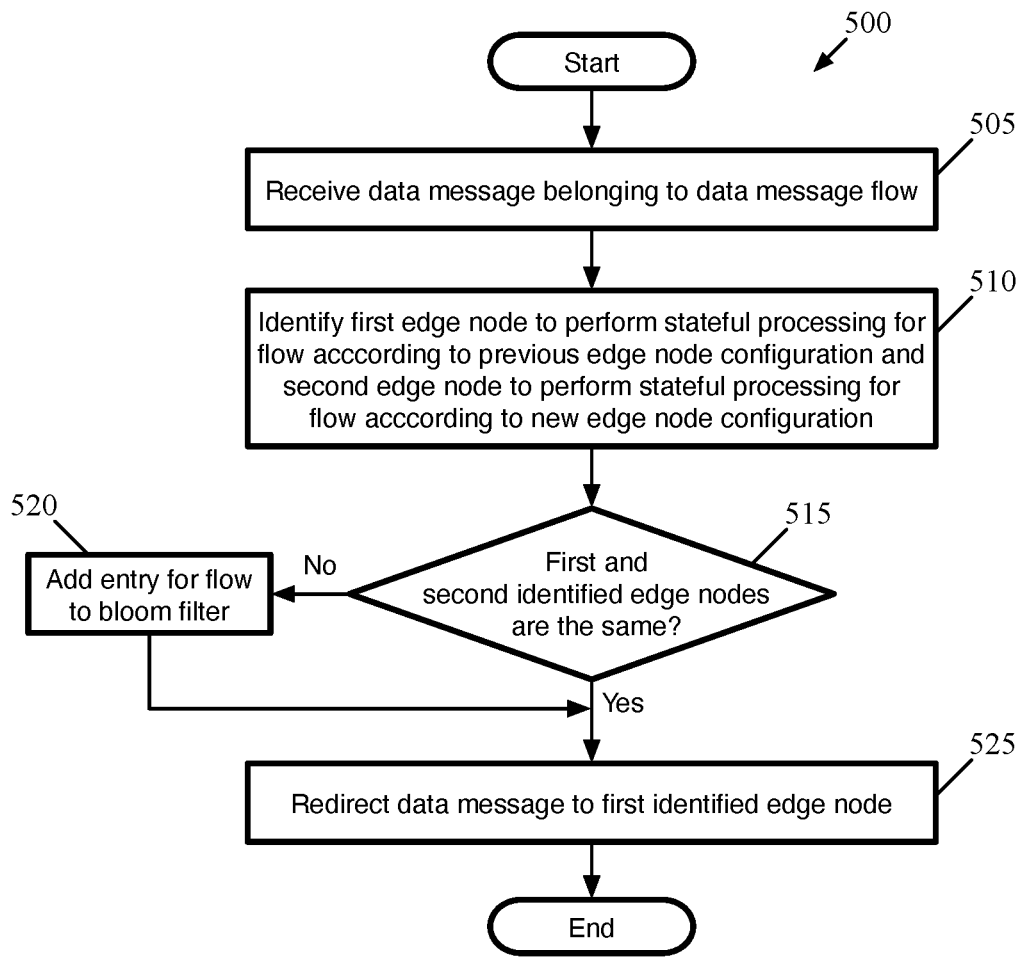
FIG. 5 conceptually illustrates a process of some embodiments for processing a data message during the first stage of transition.

FIG. 5 conceptually illustrates a process 500 of some embodiments for processing a data message during the first stage of transition. The process 500 is performed by an edge node in an active-active edge cluster (e.g., by the edge node datapath that implements an SR in an active-active SR cluster that performs stateful processing). At this point, all of the edge nodes in the cluster have received a command (e.g., from the management plane) specifying the new edge node configuration (e.g., adding or removing an edge node) and the first transition stage has begun. It should be noted that the process 500 does not cover the actual stateful processing, which occurs after redirection is handled (either by the same edge node or a different edge node to which a data message is redirected). The process 500 will be described in part by reference to FIG. 6, which illustrates a consistent hashing table, and FIG. 7, which illustrates a bloom filter.

As shown, the process 500 begins by receiving (at 505) a data message belonging to a data message flow. The data message may be received at the edge node from an external physical router or from a managed forwarding element implementing a DR (e.g., within the same datacenter as the edge node). In addition, the data message may belong to an existing data message flow or could be a connection initiation message (e.g., a SYN or SYN-ACK message) for a new data message flow.

The process 500 identifies (at 510) a first edge node to perform stateful processing for the flow according to the previous edge node configuration and a second edge node to perform stateful processing for the flow according to the new edge node configuration. In some embodiments, the edge node hashes a flow identifier (or a specific portion thereof) and uses its consistent hashing table to identify the first and second edge nodes for the flow. As described above, some embodiments use the source IP address for data messages received from the external network and the destination IP address for data messages received from the logical network in the datacenter. These addresses are typically not subject to address translation (at least within the datacenter in a way that would affect the edge node processing) and thus can be used to better ensure that data traffic in one direction is processed by the same edge node as data traffic in the other direction.

Figures 6, 7:
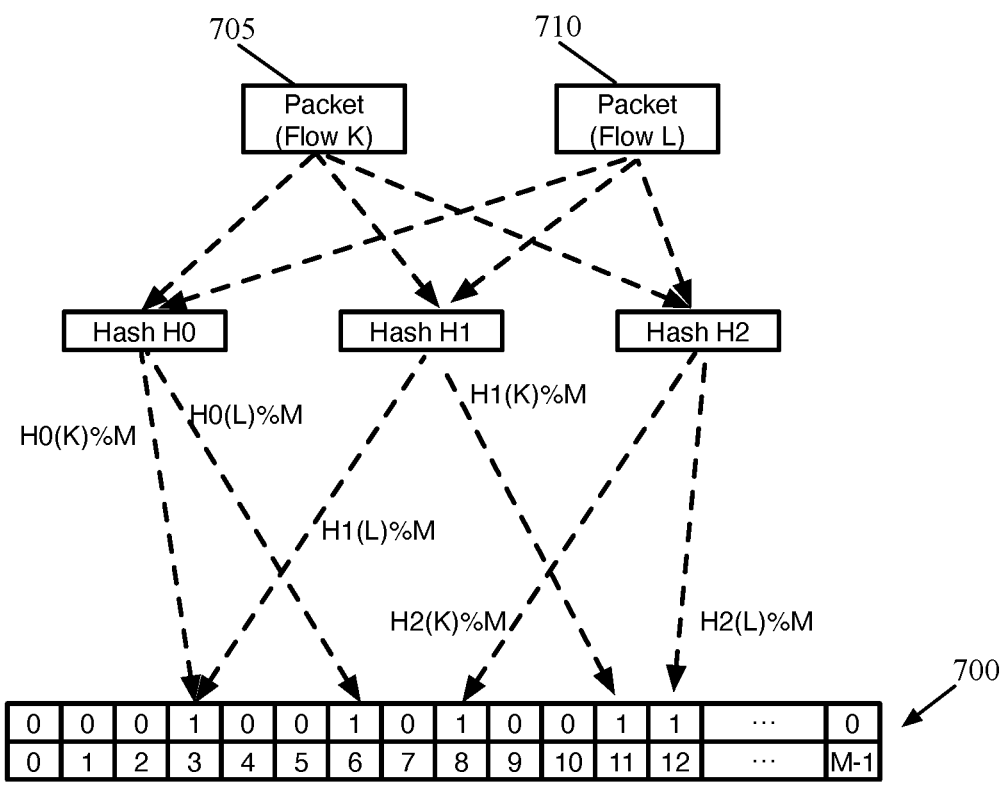
FIG. 6 conceptually illustrates a consistent hashing table of some embodiments used for a transition from an edge node configuration with four edge nodes to an updated edge node configuration with a fifth node added.
FIG. 7 conceptually illustrates an example of a bloom filter of some embodiments for tracking data message flows.

FIG. 6 conceptually illustrates a consistent hashing table 600 of some embodiments used for a transition from an edge node configuration with four edge nodes to an updated edge node configuration with a fifth node added. Consistent hashing, rather than using a simple (Hash) % N algorithm (where N equals the number of edge nodes), generates X hash buckets that are each assigned to an edge node, with X being significantly larger than N. The algorithm is such that a change in N (adding or removing an edge node) only affects a few of the hash buckets. Specifically, when a new edge node is added, a small number of the hash buckets are assigned to the new edge node while the other hash buckets are assigned to the same edge node as in the previous configuration. When an edge node is removed, the hash buckets previously assigned to that edge node are reassigned, but none of the other hash buckets are affected. In the example table 600, hash buckets 1, 9, and 11 are changed from the old configuration to the new configuration (for redirection to the newly added node), with the rest of the hash buckets mapping to the same node in both. Thus, only approximately 3/16 of the data message flows sent to the edge nodes will be mapped to a different edge node in the new configuration as compared to the old configuration.

Returning to FIG. 5, the process 500 next determines (at 515) whether the first and second identified edge nodes are the same. That is, having computed a hash for the data message, the process determines whether the hash belongs to a hash bucket that maps to different edge nodes in the previous and new configurations.

If the first and second edge nodes are different, the process 500 adds (at 520) an entry for the data message flow to a bloom filter being built up for the transition. A bloom filter is an example of a probabilistic filter used in some embodiments to track connections that exist prior to the second transition stage. A bloom filter, in some embodiments, is a space-saving technique to track members of a set (e.g., a set of connections) that trades a decrease in resource usage (both memory and lookup time) for the possibility of false positives. Specifically, a bloom filter uses a large bit vector with each bit initially set to 0. To add an element (e.g., a data message flow) to the bloom filter, multiple different hashes of the element are computed. Each of these hashes correlates to one of the bits in the bit vector (e.g., by computing the hash % M, where M is the number of bits), and these bits are changed to 1. Thus, to check whether a data message flow is in the set of flows represented by the bloom filter, the multiple hashes are computed and it is determined whether all of the bits identified by the hashes are set to 1.

FIG. 7 conceptually illustrates an example of a bloom filter 700 of some embodiments for tracking data message flows. In this example, the bloom filter 700 is an M-length bit vector and the flows to which two data packets 705 and 710 belong are being added to the bloom filter. As shown, three hashes H0, H1, and H2 are computed for each of these data packets 705 and 710. These different hashes could use different inputs (e.g., different portions of connection identifiers for the data packets), different hash algorithms, or be portions of the outputs of the same hash function, so long as there is no correlation between the outputs. The edge node building the bloom filter 700 computes each hash function output modulo M (the length of the bit vector) to identify a specific bit for each computation. The first data packet 705 (belonging to data message flow K) correlates to bits 3 (H0(K) % M), 11 (H1(K) % M), and 8 (H2(K) % M), while the second data packet 710 (belonging to data message flow L) correlates to bits 6 (H0(L) % M), 3 (H1(L) % M), and 12 (H2(L) % M). In this example, bit 3 is used twice, but because multiple hash functions are used the two different data message flows K and L map to different groups of bits.

In the process 500 only data message flows that are redirected to different edge nodes in the new configuration are entered into the bloom filter (because only these data message flows need to be matched against the bloom filter in the second transition stage). Other embodiments, however, enter all of the data message flows into the bloom filter irrespective of whether these flows are redirected to a different edge node in the new configuration or not. In addition, some embodiments use two separate bloom filters on each edge node, with one filter for data messages received from the external network and another filter for data messages received from the logical network. It should be noted that, rather than track whether each data message flow has been added to the bloom filter during the first transition stage, some embodiments compute the hashes and set the corresponding bits to 1 for each data message of a data message flow received during this time period. For each data message of a flow after the first data message, the bits will already be set to 1, so this will not affect the bloom filter.

Irrespective of whether the first and second identified edge nodes are the same for a data message, the process 500 redirects (at 525) the data message to the first identified edge node. That is, during the first transition stage, the edge nodes use the old consistent hashing table buckets for data message redirection. During this first stage, a newly added edge node may receive data messages from the logical network or the external network (if their respective ECMP algorithms have been updated to account for the new node) but always redirects these data messages to one of the previously-existing edge nodes. Similarly, an edge node specified for removal may no longer receive any data messages from the logical network or the external network, but the other recipient edge nodes still redirect data messages to that edge node.

It should be noted that in this description (as well as the description of redirection above or below), redirection may include simply performing the stateful processing for the data message at the recipient edge node, if that recipient edge node is also the edge node identified by the consistent hashing algorithm. If the recipient edge node and redirection edge node are different, then the data message is encapsulated and transmitted through the network (e.g., using a logical network identifier for a logical switch specific to communication between the edge nodes of a cluster) so that the redirection edge node can perform stateful processing on the data message and forward the data message to its destination (either within the logical network or the external network).

After a pre-specified time duration, the first stage ends and a second stage of the transition begins. During this second stage, data message flows that existed prior to the second stage are redirected for stateful processing to an edge node selected using the previous configuration while new data message flows are redirected for stateful processing to an edge node selected using the new configuration.

Figure 8:
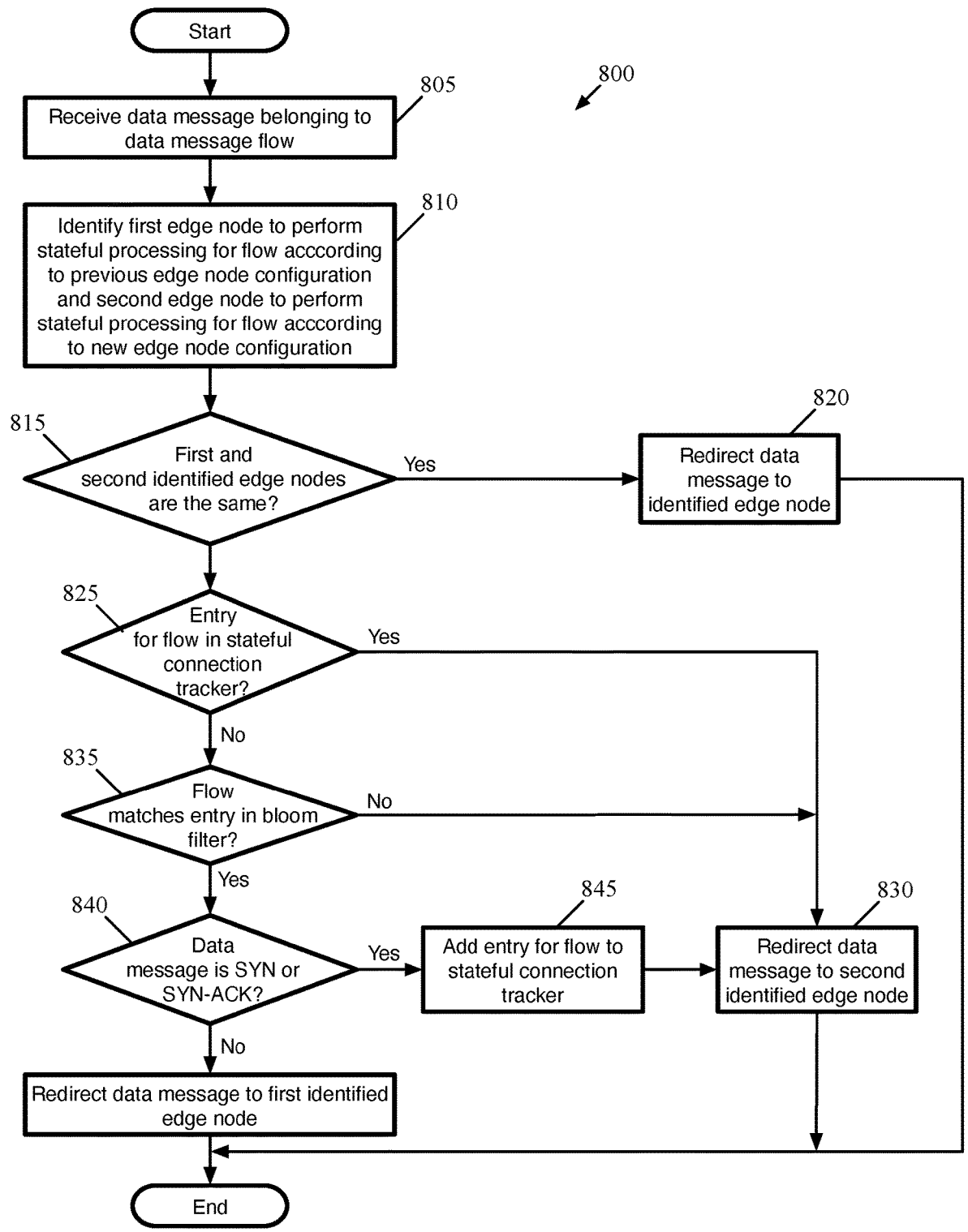
FIG. 8 conceptually illustrates a process of some embodiments for processing a data message during the second stage of transition.

FIG. 8 conceptually illustrates a process 800 of some embodiments for processing a data message during this second stage of transition. The process 800 is performed by an edge node in an active-active edge cluster (e.g., by the edge node datapath that implements an SR in an active-active SR cluster that performs stateful processing). In some embodiments, the edge nodes in the cluster all receive a command (e.g., from the management plane) specifying to transition to the second transition stage. In other embodiments, however, the duration of the first stage is a prespecified length, so the edge nodes synchronously move from the first stage to the second stage without additional intervention.

As mentioned, during this stage new data message flows are redirected according to the new configuration while previously existing data message flows are redirected according to the old configuration. Some embodiments use a combination of the consistent hashing table, the bloom filter built up during the first transition stage, and a stateful connection tracker to ensure that flows are classified as previously existing or new using the minimum necessary resources (the consistent hashing table uses the least resources, then the bloom filter, then the more memory-intensive stateful connection tracker). It should be noted that while these various data structures are shown as being consulted in a particular order, other embodiments might consult them in a different order (e.g., consulting the stateful connection tracker only after a flow has matched a bloom filter entry).

As shown, the process 800 begins by receiving (at 805) a data message belonging to a data message flow. The data message may be received at the edge node from an external physical router or from a managed forwarding element implementing a DR (e.g., within the same datacenter as the edge node). In addition, the data message may belong to an existing data message flow or could be a connection initiation message (e.g., a SYN or SYN-ACK message) for a new data message flow.

The process 800 identifies (at 810) a first edge node to perform stateful processing for the flow according to the previous edge node configuration and a second edge node to perform stateful processing for the flow according to the new edge node configuration. As described above, in some embodiments the edge node hashes a flow identifier (or a specific portion thereof) and uses its consistent hashing table to identify the first and second edge nodes for the flow. For instance, some embodiments use the source IP address for data messages received from the external network and the destination IP address for data messages received from the logical network in the datacenter. Some embodiments use a consistent hashing table, such as that shown in FIG. 6, to identify both the first and second edge nodes for a data message.

Next, the process 800 determines (at 815) whether the first and second identified edge nodes are the same. That is, having computed a hash for the data message, the process determines whether the hash belongs to a hash bucket that maps to different edge nodes in the previous and new configurations. If the first and second identified edge nodes are the same for a data message, then it does not matter whether that data message belongs to a data message flow that existed prior to the second transition stage and the process 800 redirects (at 820) the data message to the identified edge node. As indicated above, this redirection could simply involve performing stateful processing at the recipient edge node (i.e., the edge node performing process 800) and forwarding the data message to its destination if that is also the identified edge node for stateful processing. Otherwise, the redirection involves encapsulating the data message and transmitting it to a different edge node that then performs the stateful processing and forwarding of the data message.

However, if different edge nodes are identified for the data message flow in the previous and new configurations, then the process 800 determines whether the data message existed prior to the second transition stage. To make this determination, the process 800 first determines (at 825) whether an entry exists for the flow in the stateful connection tracker. In some embodiments, the stateful connection tracker only stores entries for new flows started during the second transition stage that match the bloom filter as false positives (other embodiments store entries for all new flows started during this stage). As described below, if a data message matches a bloom filter entry but is a connection initiation message indicative of a new flow, that data message flow is added to the stateful connection tracker. As such, if an entry is found for the data message flow in the stateful connection tracker, then the data message belongs to a new flow started during the second transition stage and the process redirects (at 830) the data message to the second identified edge node (i.e., the edge node identified by the consistent hashing algorithm using the new edge node configuration). As before, the edge node to which the data message is redirected could be the edge node performing the process 800 or it could be a different edge node in the cluster.

If no entry is found in the stateful connection tracker, then the process 800 determines (at 835) whether the data message flow to which the data message belongs matches an entry in the bloom filter. This process assumes that the ECMP algorithms used by the external router(s) and the logical network DR are constant from the first transition stage to the second transition stage and thus that any previously-existing data message flow that is moved from the old configuration to the new configuration will have an entry in the bloom filter because the edge node performing the process 800 will have created that entry during the first transition stage.

As such, if the data message flow does not match an entry in the bloom filter, the process 800 concludes that the flow did not exist prior to the second transition stage and redirects (at 830) the data message to the second identified edge node (i.e., the edge node identified by the consistent hashing algorithm using the new edge node configuration). As before, the edge node to which the data message is redirected could be the edge node performing the process 800 or it could be a different edge node in the cluster.

While the bloom filter could give a false positive result (identifying a new flow as previously-existing), it should not give a false negative. Referring to the bloom filter 700 in FIG. 7, when a data message is received (assuming the first and second identified edge nodes for the data message are different), the edge node computes the various hashes H0, H1, and H2 and determines whether the bits in the bit vector to which these hashes correlate are set to 0 or 1. If at least one of the bloom filter hashes for a data message does not correlate to a bit that has been set to 1, then the recipient edge node did not set an entry in the bloom filter for this flow, meaning that the flow did not exist during the first transition stage.

However, if the data message flow does match a bloom filter entry (e.g., all of the hashes for the data message correlate to a bit set to 1), then the process 800 performs additional determinations to see if the data message flow is new or previously-existing. Because a new data message flow could match a bloom filter entry as a false positive (the likelihood of false positives depends on the number of data message flows and the length of the bit vector), some embodiments use additional checks when a positive result is found in the bloom filter. As indicated above, the use of the stateful connection tracker is one such additional check, which may be performed prior to application of the bloom filter.

In some embodiments, the process 800 determines (at 840) whether the data message is a connection initiation message. Specifically, some embodiments determine whether the data message is a TCP SYN or SYN-ACK message. The TCP three-way handshake starts with the initiator (client) sending a SYN message and the responder (server) sending a SYN-ACK message. Because the different directions could be sent to different edge nodes (i.e., the reason for using redirection), a particular edge node could see either a SYN or a SYN-ACK message (or their equivalents for other protocols) as the first message in a data message flow.

If the data message is a connection initiation message, the process adds (at 845) an entry for the data message flow to a stateful connection tracker and redirects (at 830) the data message to the second identified edge node (i.e., the edge node identified by the consistent hashing algorithm using the new edge node configuration). As before, the edge node to which the data message is redirected could be the edge node performing the process 800 or it could be a different edge node in the cluster.

As indicated, the stateful connection tracker stores a list of connections that started during the second transition stage (i.e., that did not exist prior to this stage) and that have false positive matches in the bloom filter. Some embodiments store a list of such data message flows using their 5-tuple (i.e., source and destination network addresses, source and destination transport layer port numbers, and transport layer protocol). While the use of such a connection tracker for all connections that change edge nodes from the previous to new edge node configurations could eliminate the need for a bloom filter at all, use of the stateful connection tracker typically requires more resources (i.e., significantly more memory per entry) than the bloom filter. As such, the bloom filter is used as a primary measure to identify new data message flows with the connection tracker as a backup to handle the false positives.

Figure 9:
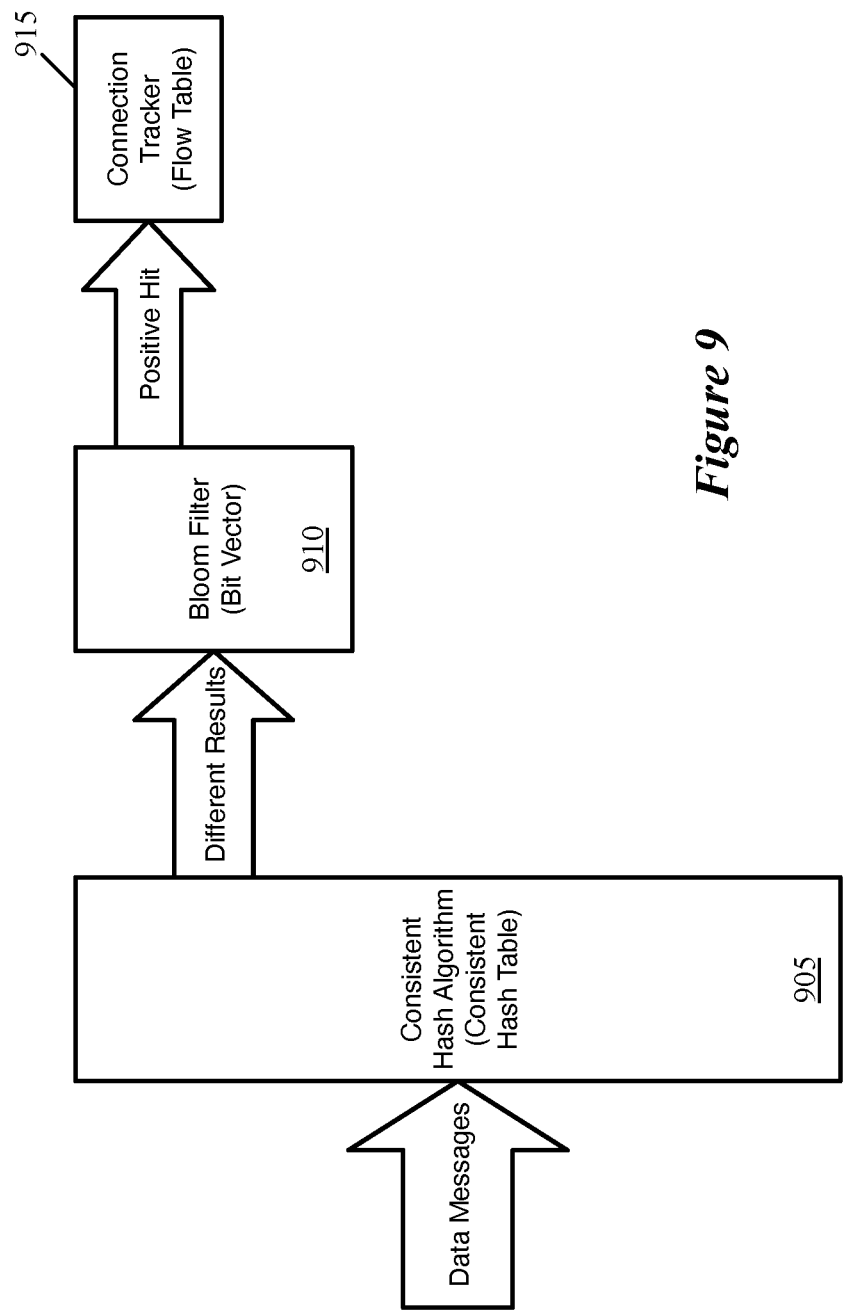
FIG. 9 conceptually illustrates the pipeline of data structures used to determine to which edge node a recipient edge node redirects a data message during the second transition stage.

FIG. 9 conceptually illustrates the pipeline of data structures used to determine to which edge node a recipient edge node redirects a data message during this second transition stage. As shown, the consistent hashing algorithm 905 (which uses a consistent hashing table) is applied to all data messages received at the edge node. This is the simplest, least resource-intensive data structure as it involves a single hash and a lookup in a static table. Some percentage of these data messages map to hash buckets that change from the previous to new edge node configurations and thus are sent to the bloom filter 910. The bloom filter 910 uses multiple hashes and a bit vector or set of bit vectors. While requiring more resources per lookup than the consistent hash algorithm, the bloom filter 910 is nevertheless resource efficient. Any false positive hits on the bloom filter (a percentage of the overall data messages sent to the bloom filter) have entries stored in the connection tracker 915, which uses a more memory-intensive flow table.

Returning to FIG. 8, if the data message flow does not match an entry in the stateful connection tracker, does match an entry in the bloom filter, and the data message is not a connection initiation message, then the bloom filter match is an accurate positive hit and the data message flow existed prior to the second transition stage. In this case, the process 800 redirects (at 850) the data message to the first identified edge node (i.e., the edge node identified by the consistent hashing algorithm using the previous edge node configuration). As before, the edge node to which the data message is redirected could be the edge node performing the process 800 or it could be a different edge node in the cluster.

After another pre-specified time duration, the second transition stage ends and a third (stable) stage begins. In the third stage, all data message flows are redirected according to the new edge node configuration. As such, the edge nodes can remove their probabilistic filters and consistent hashing tables and simply use the consistent hashing algorithm according to the new edge node configuration. If an edge node is specified for removal from the cluster, the edge node can be shut down at this time (or the SR configuration removed from the edge node if the edge node will still remain operational for other SRs).

FIG. 10 conceptually illustrates an electronic system 1000 with which some embodiments of the invention are implemented. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random-access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media,"

and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 2, 5, and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for forwarding data messages between edge nodes that implement a logical router gateway, the edge nodes for performing stateful processing on data message flows between a logical network and an external network, the method comprising:

at a particular edge node, receiving a data message belonging to a data message flow, wherein data messages are sent from the external network to the edge nodes using a first equal-cost multi-path (ECMP) algorithm and sent from the logical network to the edge nodes using a second ECMP algorithm, wherein the edge nodes use a deterministic algorithm to select a respective one of the edge nodes to perform stateful processing for each respective data message flow;

identifying (i) a first edge node to perform stateful processing for the data message flow in a previous configuration of the edge nodes and (ii) a second edge node to perform stateful processing for the data message flow in a new configuration of the edge nodes according to the deterministic algorithm;

when the first edge node and the second edge node are different edge nodes, using a probabilistic filter and a stateful connection tracker to determine whether the data message flow existed prior to a particular time; and when the data message flow did not exist prior to the particular time, selecting the second edge node to process the received data message.

2. The method of claim 1, wherein the deterministic algorithm comprises the edge nodes hashing destination network addresses of data messages received from the logical network and hashing source network addresses of data messages received from the external network.

3. The method of claim 1, wherein the previous configuration comprises a particular set of edge nodes and the new configuration comprises the particular set of edge nodes in addition to a new added edge node.

4. The method of claim 3, wherein during a current transition stage, the edge nodes only select the new added edge node to perform stateful processing for data message flows that did not exist prior to the particular time.

5. The method of claim 1, wherein the previous configuration comprises a set of edge nodes and the new configuration comprises the set of edge nodes without a particular one of the edge nodes in the set of edge nodes that is specified for removal.

6. The method of claim 5, wherein during a current transition stage, the edge nodes only select the particular edge node to perform stateful processing for data message flows that existed prior to the particular time.

7. The method of claim 1, wherein:

the data message is received during a second stage of transition from the previous configuration of the edge nodes to the new configuration of the edge nodes; and during a first, prior stage of the transition the particular edge node selects edge nodes to perform stateful processing for data message flows received at the particular edge node only according to the previous configuration of the edge nodes.

8. The method of claim 7, wherein during the first stage, for each respective data message flow received at the particular edge node, the particular edge node (i) identifies respective first and second edge nodes for the data message flow, (ii) selects the respective first edge node to perform stateful processing for the respective data message flow, and (iii) adds an entry to the probabilistic filter for the respective data message flow.

9. The method of claim 8, wherein the particular time is a time at which the first stage ends and the second stage begins.

10. The method of claim 7, wherein during a third stage of the transition, after completion of the second stage, the particular edge node selects edge nodes to perform stateful processing for data message flows received at the particular edge node only according to the new configuration of the edge nodes.

11. The method of claim 10, wherein:
data messages belonging to any remaining data message flow still existing from prior to the particular time are dropped during the third stage if the first edge node and second edge node identified for the remaining data message flow are different; and
a duration of the second stage is set to be long enough that a majority of flows existing prior to the particular time no longer exist when the third stage begins.

12. The method of claim 7, wherein the first stage begins based on the particular edge node and the other edge nodes receiving a command from a network management system.

13. The method of claim 12, wherein each stage of the transition has a prespecified duration such that each of the edge nodes transitions between stages at the same time.

14. The method of claim 1, wherein using the probabilistic filter and the stateful connection tracker comprises determining whether the data message flow matches an entry in the probabilistic filter.

15. The method of claim 14, wherein using the probabilistic filter and the stateful connection tracker further comprises determining that the data message flow did not exist prior to the particular time when the data message flow does not match an entry in the probabilistic filter.

16. The method of claim 15, wherein using the probabilistic filter and the stateful connection tracker further comprises, prior to determining whether the data message flow matches an entry in the probabilistic filter, using the stateful connection tracker to determine whether the data message flow existed prior to the particular time.

17. The method of claim 16, wherein using the stateful connection tracker to determine whether the data message flow existed prior to the particular time comprises:
when the stateful connection tracker includes an entry for the data message flow, determining that the data message flow did not exist prior to the particular time; and
when the stateful connection tracker does not include an entry for the data message flow, determining whether the data message flow matches an entry in the probabilistic filter.

18. The method of claim 15, wherein using the probabilistic filter and the stateful connection tracker further comprises:
when the data message flow matches an entry in the probabilistic filter, determining whether the data message is a connection setup message indicative of a new data message flow; and
when the data message is a connection setup message indicative of a new data message flow, determining that the data message flow did not exist prior to the particular time and adding an entry for the data message flow to the stateful connection tracker.

19. The method of claim 18, wherein the connection setup message is one of a transport control protocol (TCP) SYN packet and a TCP SYN-ACK packet.

20. The method of claim 1, wherein the probabilistic filter is a bloom filter.

21. The method of claim 1, wherein the other edge nodes that implement the logical router gateway also receive data messages belonging to different data message flows from the external network and from the logical network, determine whether the different data message flows existed prior to the particular time, and select edge nodes to process the data messages.

22. A non-transitory machine-readable medium storing a program which when executed by at least one processing unit forwards data messages between edge nodes that implement a logical router gateway, the edge nodes for performing stateful processing on data message flows between a logical network and an external network, the program comprising sets of instructions for:
at a particular edge node, receiving a data message belonging to a data message flow, wherein data messages are sent from the external network to the edge nodes using a first equal-cost multi-path (ECMP) algorithm and sent from the logical network to the edge nodes using a second ECMP algorithm, wherein the edge nodes use a deterministic algorithm to select a respective one of the edge nodes to perform stateful processing for each respective data message flow;
identifying (i) a first edge node to perform stateful processing for the data message flow in a previous configuration of the edge nodes and (ii) a second edge node to perform stateful processing for the data message flow in a new configuration of the edge nodes according to the deterministic algorithm;
when the first edge node and the second edge node are different edge nodes, using a probabilistic filter and a stateful connection tracker to determine whether the data message flow existed prior to a particular time; and
when the data message flow did not exist prior to the particular time, selecting the second edge node to process the received data message.

23. The non-transitory machine-readable medium of claim 22, wherein the deterministic algorithm comprises the edge nodes hashing destination network addresses of data messages received from the logical network and hashing source network addresses of data messages received from the external network.

24. The non-transitory machine-readable medium of claim 22, wherein:
the data message is received during a second stage of transition from the previous configuration of the edge nodes to the new configuration of the edge nodes; and
during a first, prior stage of the transition the particular edge node selects edge nodes to perform stateful processing for data message flows received at the particular edge node only according to the previous configuration of the edge nodes.

25. The non-transitory machine-readable medium of claim 24, wherein:
during the first stage, for each respective data message flow received at the particular edge node, the particular edge node (i) identifies respective first and second edge nodes for the data message flow, (ii) selects the respective first edge node to perform stateful processing for the respective data message flow, and (iii) adds an entry to the probabilistic filter for the respective data message flow; and
during a third stage of the transition, after completion of the second stage, the particular edge node selects edge nodes to perform stateful processing for data message flows received at the particular edge node only according to the new configuration of the edge nodes.

* * * * *